May 4, 1965     H. W. TRIPP     3,181,503
FARROWING PEN WITH FLOOR HEATED PLIGHT AREAS
Filed Aug. 17, 1962     3 Sheets-Sheet 1

INVENTOR.
HERMAN W. TRIPP
BY
ATTORNEYS

May 4, 1965  H. W. TRIPP  3,181,503
FARROWING PEN WITH FLOOR HEATED PLIGHT AREAS
Filed Aug. 17, 1962  3 Sheets-Sheet 2

INVENTOR.
HERMAN W. TRIPP
BY
ATTORNEYS

May 4, 1965 H. W. TRIPP 3,181,503
FARROWING PEN WITH FLOOR HEATED PLIGHT AREAS
Filed Aug. 17, 1962 3 Sheets-Sheet 3

INVENTOR.
HERMAN W. TRIPP
BY
ATTORNEYS

United States Patent Office 3,181,503
Patented May 4, 1965

3,181,503
FARROWING PEN WITH FLOOR HEATED
PLIGHT AREAS
Herman W. Tripp, Wiggins, Colo., assignor to Agricultural Research Development, Inc., Denver, Colo., a corporation of Colorado
Filed Aug. 17, 1962, Ser. No. 217,756
14 Claims. (Cl. 119—20)

This invention relates to animal pens and, more specifically, to hog farrowing stalls.

In recent years there have been considerable advances made in the methods and apparatus utilized in raising stock, particularly cattle and poultry. These scientific approaches enable the rancher and breeder to produce a better and more uniform product in less time and with a considerably reduced loss ratio. Unfortunately, however, up to the present time little has been accomplished in attempts to upgrade the methods and equipment used in breeding and raising other types of food-producing animals such as hogs and sheep even though they constitute a significant part of the human diet.

Hogs, for example, in past years have been largely garbage-fed and little provision has been made for their comfort or well-being even during such times as when the sow is giving birth to her pigs. Obviously, much could be accomplished with a controlled and balanced diet and furthermore, it has now been proven that tremendous advantages can be realized through the use of scientifically-designed equipment such as that which forms the subject matter of the present invention.

In the past, a sow gave birth to her pigs in an ordinary pen which was usually six to eight feet square. The floor was usually cold requiring some type of bedding such as straw. Little or no provision was made for getting rid of the sow's body waste which quickly became mixed into the bedding thus fouling the nest. Instinctively the sow attempts to make a nest in the bedding which she forms by moving the straw back and forth with her nose and feet to form a soft support for her body and, during this process, the waste products from her body are further distributed throughout the pen.

At the time the sow is to give birth to the pigs she is extremely hungry and thirsty and, if adequate supplies of food and water are not made available to her, she becomes quite restless, nervous and sometimes ill-tempered. She customarily lays in the center of the pen and the weight of her body produces a sizeable depression in the nest. This depression coupled with her restless behaviour which causes her to get up and down frequently to rearrange her bed, relieve herself and feed is a prime factor causing the high infant mortality rate in new-born pigs that, according to national averages, runs around 35%. The pigs are unsteady on their feet especially on the soft bedding underfoot which results in their rolling into the depression made by the sow's body and she all too often steps on them or mixes them into the bedding where they are crushed by the weight of her body when she lays back down.

Temperature conditions are also an extremely important factor in the farrowing process. Pens of the type aforementioned are usually chilly to the new-born pigs who are delivered from the sow's body at a temperature of slightly more than 100° F. If, after being born, the pigs are subjected to temperatures that are considerably cooler, i.e. in the 70° F. range, they become chilled which often leads to pneumonia, diarrhea and other diseases to which they become more susceptible if chilled. The new-born pigs are also attracted to the heat given off by the sow's body which is another factor contributing to the high mortality rate as they tend to crowd in close to her which is the very area of the pen in which they are most likely to get trampled and crushed.

Feeding the little pigs is also a problem in the ordinary open stall-type farrowing pen which makes no provision for supplementing the sow's milk with other feed. When not nursing, the pigs tend to root around in the bedding contaminated with their body waste and that of their mother picking up disease-producing bacteria.

By means of the instant invention, on the other hand, the natural instincts of the pig, which contrary to popular belief is quite a clean animal, are used to advantage in eliminating most of the foregoing problems. The stall is so designed that both the sow and her offspring relieve themselves in the rear third of the stall where a speical floor is provided that carries away all waste products. The need for bedding which can become contaminated is entirely eliminated. The sow is confined to an area of the stall where she cannot turn around and is, therefore, forced to eliminate waste products in the area provided for the purpose. The pigs are protected from the sow by specially-designed partitions which they can pass under to nurse yet which prevent the mother from encroaching on their private areas. The sow is maintained in a quiescent frame of mind by adequate supplies of both water and food made available to her at the front of the stall thus eliminating the tendency for her to move around and injure the pigs. A special zone heating system accomplishes several important objectives such as, for example, attracting the pigs away from their mother to reduce the chance of their being injured, keeping them warm while allowing the sow to remain cool, drawing them to a nesting area at the front of the stall so they will migrate to the rear in order to relieve themselves, and reducing the chances for pneumonia and other diseases that are either brought on or rendered more serious when the animals become chilled.

Other features of the instant farrowing stall which are equally significant to those already mentioned are the means by which the pigs and sow are fed. Carefully designed feeders eliminate all but a negligible amount of waste which is very significant in hog production due to their tendency to root feed out of the usual type of trough as they swing their heads back and forth while eating. These feeders also enable the pigs to be weaned sooner and prepare them for transfer to nursing stalls where similar equipment is used to which they have already become accustomed thus preventing the usual interruption in the growth rate that usually accompanies a change in environment and surroundings. Even the watering area is so located as to take advantage of the pigs' natural tendency to urinate immediately after they drink.

It is, therefore, the principal object of the present invention to provide a novel and improved farrowing stall.

A second objective is the provision of a unit of the type herein described which is primarily responsible for an improved growth rate and feed conversion ratio to that attainable by any of the prior art devices for this purpose.

Another object of the invention is to provide a farrowing stall which is so designed that body excrement cannot accumulate and, in fact, the animals themselves are the factor responsible for removing it from the area in which they are housed.

Still another objective of the invention is the provision of a farrowing stall that, through its unique design, reduces the infant death-rate of the new-born pigs to a small fraction of that usually experienced both from disease and injury inflicted by the sow.

A further object is to provide an animal stall that can be quickly and easily disassembled for cleaning and disinfecting at period intervals and then reassembled again in either single or multiple units with a minimum of time and effort.

Additional objects are the provision of a hog farrowing stall that is simple to construct, inexpensive to purchase and maintain, one that is versatile and readily adaptable for use in hog production operations of various sizes, a unit that is ideally suited for use in the production of specific pathogen free animals that must be kept isolated from disease-carrying hogs, and a hog pen that is clean, efficient, comfortable, rugged, compact and decorative.

Other objects will be in part apparent and in part pointed out specifically hereinafter in connection with the description of the drawings that follows, and in which.

Figure 1:
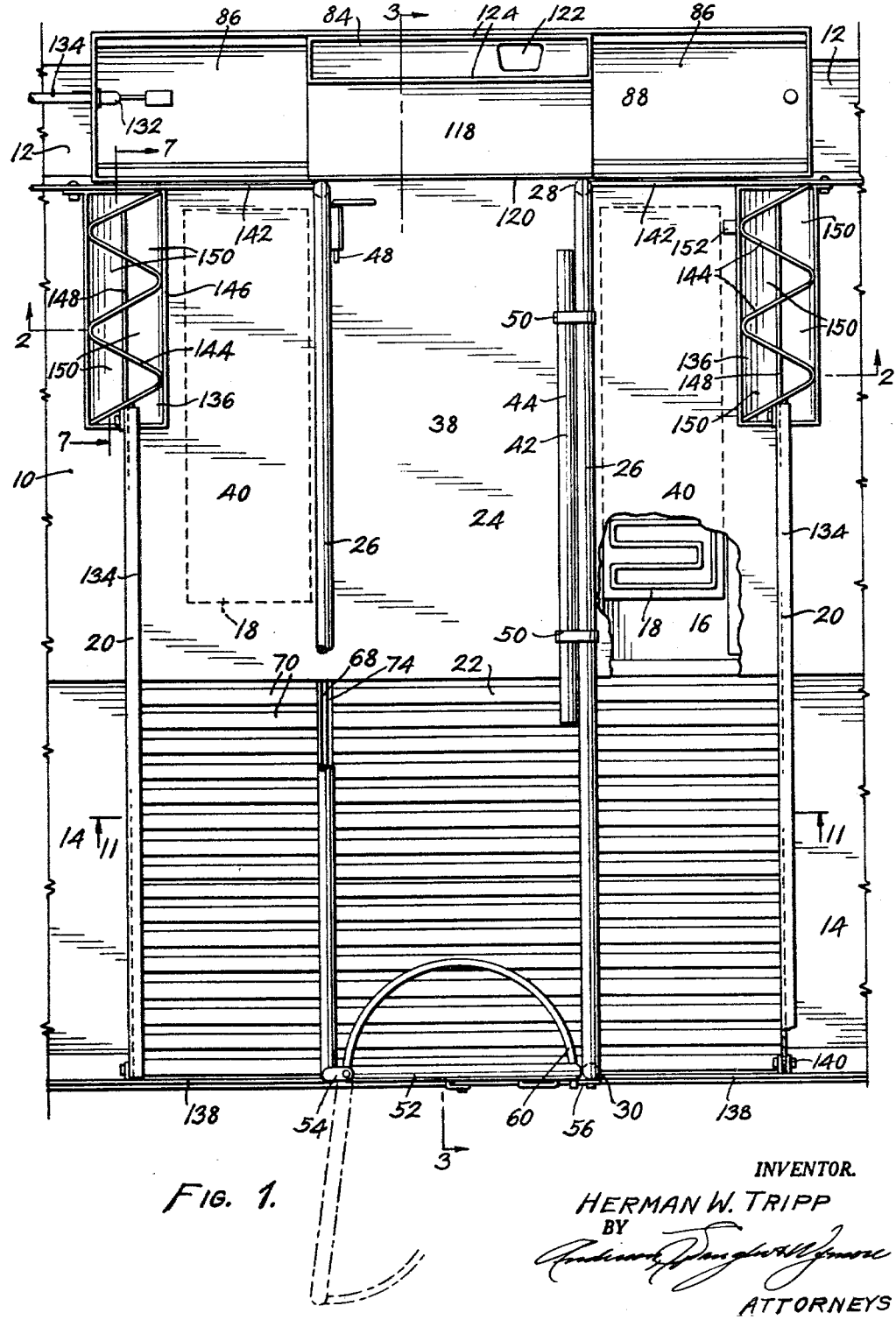
FIGURE 1 is a top plan view of the hog farrowing stall of the present invention showing certain portions broken away to conserve space and better reveal the interior construction.
Figure 2:
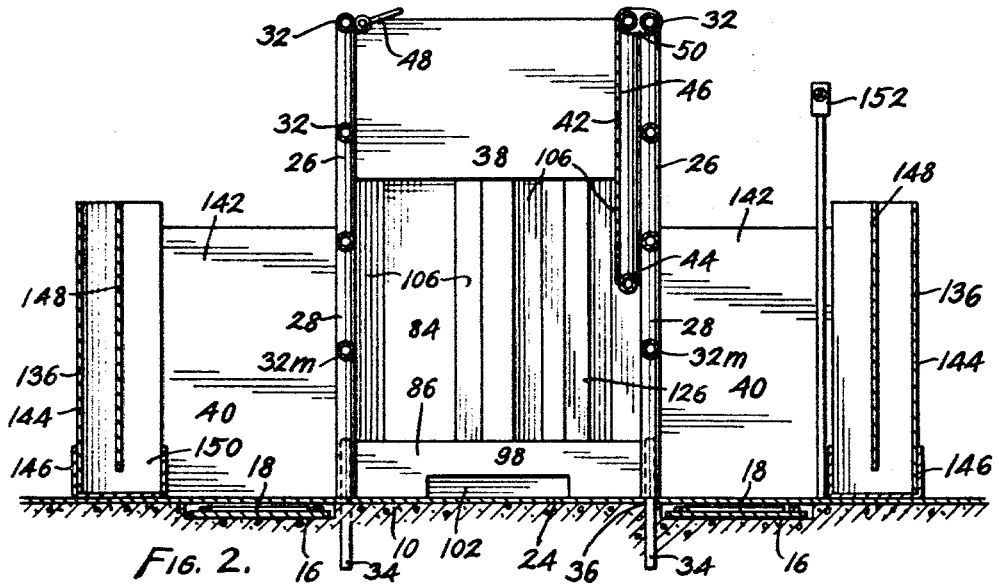
FIGURE 2 is a transverse section taken along line 2—2 of FIGURE 1.
Figure 3:
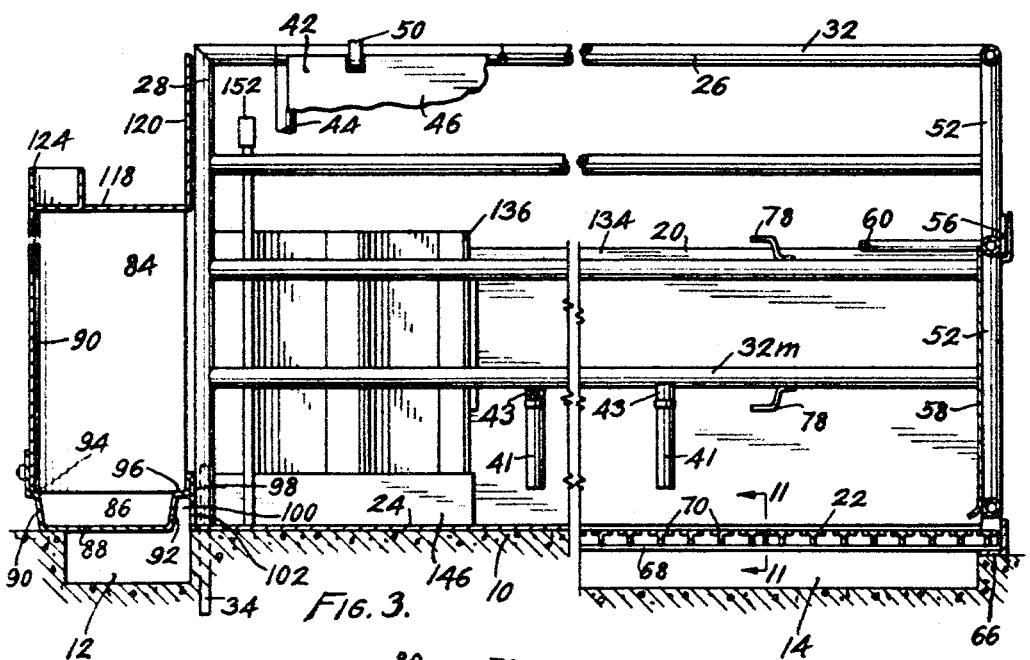
FIGURE 3 is a longitudinal section taken along line 3—3 of FIGURE 1 with certain portions broken away to conserve space.

Referring now to the drawings for a detailed description of the present invention and, initially, to FIGURES 1, 2 and 3 for this purpose, it will be noted that the farrowing stall is erected on a floor 10 which is preferably of poured concrete having a narrow trough or gutter 12 extending along the front end thereof and a wider gutter 14 extending along the rear in parallel relation to the first. Shallow rectangular recesses 16 are also preferably cast in the concrete floor at the time it is poured to receive the electric heaters 18, the details of which will be described presently. The stalls should obviously be located indoors in a suitable building provided for the purpose. While only a single stall has been shown in the drawings for purposes of simplicity, it is apparent that it is designed so that several may be arranged in side-by-side relation sharing the common sidewalls 20. In fact, the best arrangement is to provide two rows of stalls paralleling one another along opposite sides of a building separated from one another by a center aisle.

The overall dimensions of the stall are approximately five feet wide and seven feet long. These dimensions along with others that will be mentioned, while not absolute, are quite important to the satisfactory operation of the unit as they take full advantage of the animals housed therein. The gutter 14 extends forwardly from the rear edge of the stall about one-third of the length and is covered by a special T-bar grating 22 that will be described in detail in connection with FIGURES 10–13, inclusive. The front two-thirds of the stall is covered by a metal floor plate 24 which extends from the front edge of the gratings 22 over the heater wells or depressions 16 to the rear edge of gutter 12. It should be mentioned that the seven foot length-wise dimension does not include gutter 12 which lies forwardly of the rectangular area in which the animals are housed.

As illustrated herein, the interior partition walls 26 defining the enclosure for the sow are, for the most part, fabricated from tubular stock, either round or square, because of its light weight in relation to its strength and also due to the fact that the smooth exterior surfaces thereof provide little or no cracks and corners in which filth can collect thus simplifying the sterilization and decontamination procedures. These interior partition walls 26 comprise front and rear uprights 28 and 30 which are interconnected by several horizontally-disposed parallel rails 32 which are welded or otherwise permanently attached to the uprights to form an open frame. Short standpipes 34 are embedded in the concrete floor in position to receive the front and rear uprights 28 and 30 of the frames telescopically. In installations such as that illustrated where the metal floorplate 24 covers the entire front two-thirds of the stall, suitable openings 36 must, of course, be provided therein to pass the standpipes. While the use of a full-pen-width floor plate is preferred because it can be removed for cleaning, is impervious to moisture and facilitates the movement of heat by conduction into the sow area of the stall, the bare concrete floor will suffice for this purpose thereby restricting the areas that have to be covered by the plates to the heater walls 16. The frames can be bolted or pinned to the standpipes if desired to prevent their being removed accidentally by the animals. They should, however, be demountable for periodic cleaning.

Figure 10:
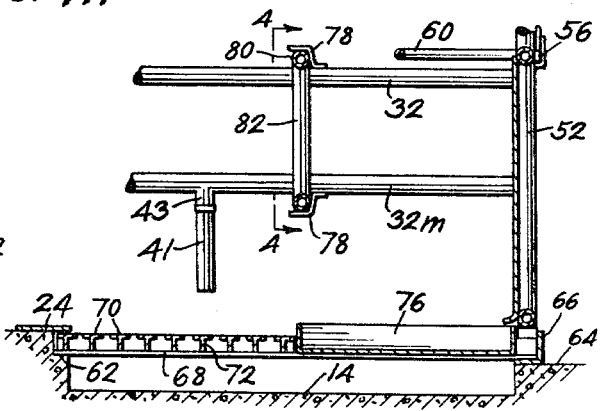
FIGURE 10 is a fragmentary section similar to FIGURE 3 except that the farrowing gate is shown in operative position.
Figure 13:
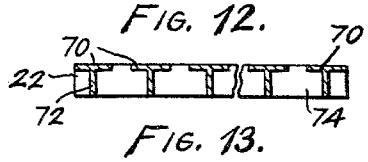
FIGURE 13 is a fragmentary section taken along line 13—13 of FIGURE 12.

These partition walls are spaced about two feet apart defining a sow area 38 which is roughly two feet wide and seven feet long running longitudinally down the center of the stall. At the same time, these partitions cooperate with sidewalls 20 to produce a pair of pig areas 40 paralleling the sow area on both sides of the latter that are of the same length but slightly narrower as can best be seen in FIGURE 1. The rails 32 of the partition walls are close enough together to prevent the sow from crawling through them into the pig areas. The top rail is, of course, high enough off the floor to prevent the sow from going over the top. The bottom rail, however, is the most significant as it must be high enough off the floor to allow the little pigs to pass freely between the pig areas and the sow area while, at the same time, preventing the sow from crawling underneath. The pigs must be permitted free access to the sow area so that they can nurse as there is no way of controlling which side of her body the mother will lie. When small sows are placed in the stall that might be able to crawl under the lowermost rail 32m, downwardly extending extensions 41 can be screwed into place as shown in FIGURES 3 and 10 and internally-threaded integral T-connections 43 provided at spaced intervals for this purpose.

Some sows, especially the larger ones, may be able to climb out of the stall if means are not provided for preventing them from doing so. For this purpose, one of the partition walls 26 is shown provided with a hinged roof-forming gate 42 comprising a rectangular frame 44 overlayed with a metal sheet 46 which swings upwardly into position covering approximately the front half of the sow area 38 where it is latched in place by latch 48 carried by the other partition wall. This gate 42 is mounted on the wall by hinges 50 on top edge thereof so that it will fold down into the position alongside said wall shown in FIGURES 1, 2 and 3 when not in use. It is unnecessary for this gate to cover the entire sow area because it is too narrow to permit the sow to turn around and she must stand on her hind feet to climb out. Thus, as long as the gate extends forwardly far enough to prevent her from climbing out over the front of the stall and rearwardly to a point where she cannot get behind it, the desired function is fulfilled.

The rear extremity of the sow area 38 is closed by a gate 52 that is hingedly attached to one of the partition wall uprights 30 by hinges 54 for swinging movement from the open dotted-line position of FIGURE 1 into the closed full-line position thereof where it is releasably locked to the other partition wall by latch 56 interconnecting the latter. As illustrated, the inside surface of the gate, especially the lower half thereof, is covered by a plate 58 that prevents the sow from excreting any body waste outside the stall. A curved bumper 60 is also attached to the inside of the gate at or near the top of plate 58 in position to engage the sow's rump when she backs up in the stall to relieve herself. This bumper insures the fact that her droppings will fall on the gratings 22 that cover waste gutter 14.

At this point it would, perhaps, be desirable to refer briefly to FIGURES 10, 11, 12 and 13 in addition to FIGURES 1 and 3 wherein the details of the gratings 22 have been most clearly shown. Concrete floor 10 should slope slightly in the direction of waste disposal gutter 14 both to facilitate washing-down the stall and so that it will drain remaining completely dry. A step 62 is cast along the front edge of the gutter with its horizontal surface at approximately the same level as the aisle or walkway 64 outside the stall. In the particular embodiment shown herein, an angle iron 66 is laid in the aisle bordering the rear edge of the gutter thus forming a second step opposite the first which is cast in place. Across these steps are laid T-irons 68 upside down, one directly underneath each of the sidewalls 20 and others immediately beneath both partition walls 26.

The gratings 22 comprise T-irons 70 standing on their stem portions 72 and interconnected in spaced parallel relation to one another by sections of strap iron 74 welded across their ends. As shown most clearly in FIGURE 11, these gratings extend transversely between the inverted T-iron supports 68 where they rest on the cross-bars thereof while the stems form stops preventing the gratings from moving laterally.

The spacing between the T-irons making up the gratings is most important as they must be close enough together to prevent the small feet of the new-born pigs from becoming caught therebetween yet far enough apart to allow the animals to work the manure through the spaces between the cross-bars with their feet as they walk around thereon. Tests performed over extended periods of time with floors formed of the above-described gratings have proven them to be ideally suited for use in hog stalls because, even after months of continued use, they remain extremely clean due to the fact that the manure works clear through and drops into the gutter without clinging to the underside of the cross-bar portions of the T-irons or the stems. In other words, any solid excrement that the animals can work between the T-irons with their feet is already too small to engage and be retained by the stems. Furthermore, the continual movement of their feet across the top of the gratings keeps the exposed upper surfaces bright, clean and entirely free of contaminants.

Figure 4:
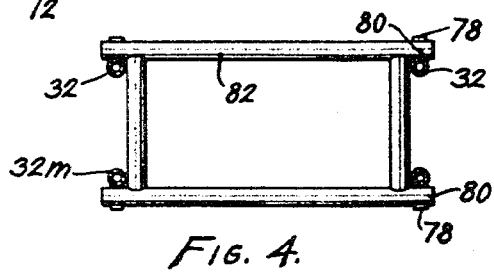
FIGURE 4 is a fragmentary section taken along line 4—4 of FIGURE 10 showing the removable farrowing gate.
Figure 5:
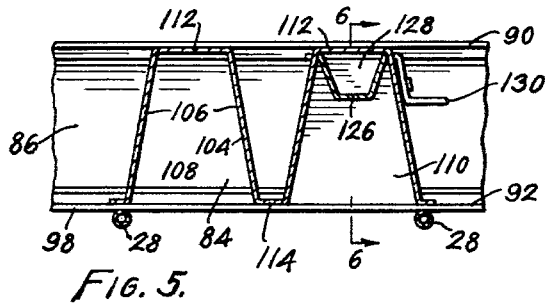
FIGURE 5 is a fragmentary horizontal section taken along line 5—5 of FIGURE 6 to an enlarged scale showing the construction of the new-born pig feeders.
Figure 6:
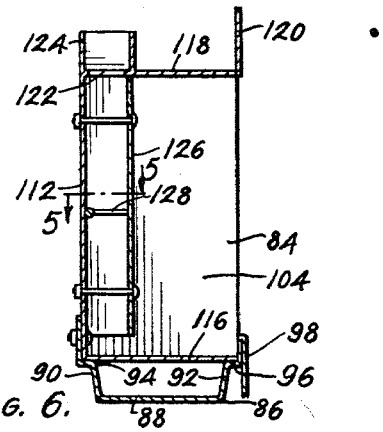
FIGURE 6 is a transverse vertical section taken along line 6—6 of FIGURE 5.
Figure 7:
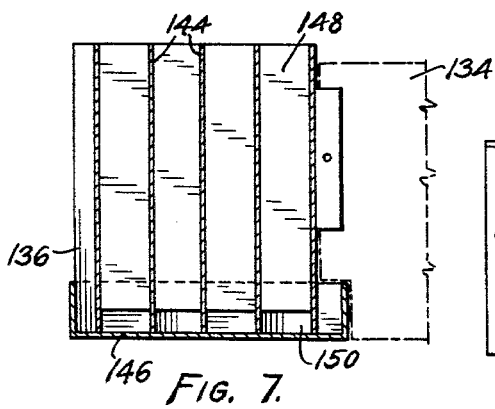
FIGURE 7 is a longitudinal vertical section taken along line 7—7 of FIGURE 1 of the baby pig feeders.
Figure 8:
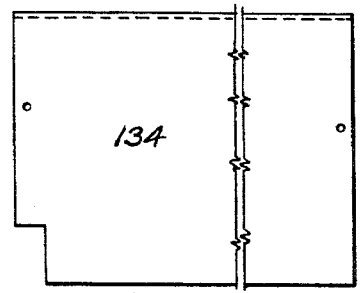
FIGURE 8 is a fragmentary side elevation, portions having been broken away, showing the demountable side walls of the stall.
Figure 9:
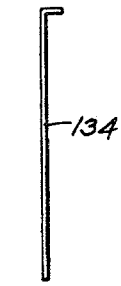
FIGURE 9 is an end elevation of the sidewall of FIGURE 8.
Figure 11:
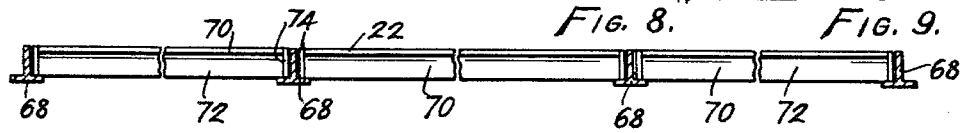
FIGURE 11 is a transverse section taken along line 11—11 of FIGURE 1 revealing the special floor through which the excrement passes into a subsurface trough for removal.
Figure 12:
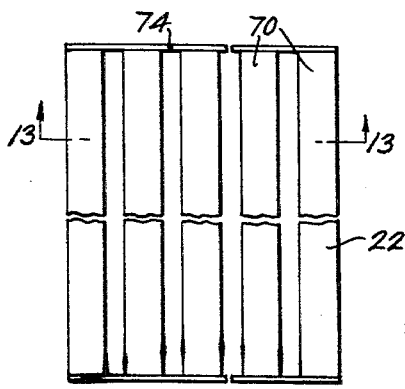
FIGURE 12 is an enlarged fragmentary top plan view of one of the gratings that make up the floor of FIGURE 11, portions thereof having been broken away to conserve space.

One specialized feature of the stall is its capability of being used for unattended births with virtually the same freedom from the hazards of the sow trampling the new-born pigs as if someone were present. The features which make this possible are revealed in FIGURES 3, 4 and 10.

The gratings in at least the sow section 38 is in two sections, the rear one of which is removed and replaced by a pan or tray 76 (FIGURE 10). The lowermost rail 32m of the portion walls 26 along with rail next above are fitted with forwardly-opening clips 78 arranged one above the other and in transverse alignment at a point immediately over the front edge of the tray 76. Into these clips slips the laterally projecting end portions 80 of a rectangular auxiliary frame 82 which, when so positioned, lies immediately behind the rump of the sow whose head is at or near the front of the stall. Thus, frame 82 cooperates with the portion walls to form a protected area above the tray. Then, when the sow delivers her pigs they drop into the tray and remain out of her reach as long as they stay there because she cannot back up. Soon after birth, they will climb over the shallow sides of the pan and move forwardly to nurse or into one of the heated zones of the pig areas. The frame 82 can be removed later by sliding it forwardly out of the clips 78 and turning it to free the end portions from the partition rails. At the same time, the tray is removed and replaced by the rear grating section.

At the front of the sow area 38 is located the feeding and watering trough unit 84 and the gutter 12 that forms a fresh air duct. These units are shown in FIGURES 2, 3, 5 and 6 to which reference will now be made. Covering the gutter 12 is an open-topped sheet metal trough 86 which is displaced forwardly so the bottom 88 thereof rests on the concrete floor 10 along its front edge. The front and rear walls 90 and 92 each contain oppositely offset steps 94 and 96 which support the feeder 84. Rear wall 98 of the trough includes a reversely-bent portion 98 that extends downwardly in spaced relation to said rear wall defining an air passage 100 therebetween which opens into the sow area through air vent 102.

It has been found that a sow is perfectly comfortable even when the stall in which she is confined is quite warm if she is provided with a source of pre-cooled air which she can breathe. As has already been mentioned, the new-born pigs must be kept quite warm and special sub-floor heaters 18 are provided for this purpose which keep the stall uncomfortably warm for the sow. The sow, however, is continuously supplied with a supply of pre-cooled air through duct 12 which keeps her contented as she is inclined to lay on her side with her nose in vent 102.

The feeder 84 has a front wall 104 that rests on step 94 and is bolted to the front wall of the watering trough 88. Cool water flows in this trough past all the stalls in a particular row. The same is true, of course, of the air duct 12 which supplies air to the whole row of stalls.

The rear of the feeder which opens into the front of the sow area divides the space between the uprights 28 of the partition walls 26 into two generally wedge-shaped compartments and this is accomplished by means of a specially designed divider 104. A hog is inclined to swing his head from side-to-side when he drinks and eats. This results in feed being tossed out of the ordinary trough and wasted. Divider 104, on the other hand, includes converging sidewalls 106 in both the watering compartment 108 and the feeding compartment 110 which conform generally to the shape of a pig's snout and thus confine the head in such a way that it cannot be swung from side-to-side. In the particular form illustrated herein, walls 106 of each compartment 108 and 110 are joined together along their front edges by a transverse section 112; whereas, the two compartments aforementioned are joined together along the rear edges of adjacent sidewalls 106 by transverse wall portion 114.

The watering compartment 108 opens directly into trough 86 while the feeding compartment 110 includes a baseplate 116 covering the watering trough. The feeder compartment also includes special provision for introducing measured amounts of feed. A lid or coverplate 118 having an upturned faceplate 120 covers the top edges of both the feeding and watering compartments. This lid has an opening 122 therethrough that leads down into the feeding compartment. An upstanding rim 124 is also provided on the coverplate producing a feed tray having the opening 122 in the bottom thereof.

Immediately underneath this opening 122 is a chute 126 bolted to transverse wall portion 112 of the feeder compartment and terminating in spaced relation above the baseplate 116. A damper-type lift gate 128 is provided inside the chute 126 operable by an external lever 130 accessible from the front of the feeder where the tray is loaded with feed. The feed falls down onto the closed gate through the opening in the bottom of the tray and fills up to the level of coverplate 118. Then, by lifting the gate, a measured quantity of feed is delivered into the bottom of the feeder compartment for the sow to eat.

One other point deserves brief mention in connection with FIGURE 1 before proceeding with a description of the facilities available in the pig areas 40 of the stall. A float-type control valve 132 can easily be placed in the watering trough connected to a source of cold water 134. This valve, of course, maintains a constant water level in the watering trough and continuously replenishes the supply of water as it is used.

In FIGURES 1, 7, 8 and 9, it will be seen that the sidewalls of the stall comprise sheet metal sideplates 134 extending from the rear of the stall forwardly about three-fourths of the length of the stall where the pig feeders 136 are joined thereto and extend the rest of the way. The rear of the pig areas are enclosed by metal plates 138 that extend laterally between the partition wall uprights 30 of adjacent stalls. Sideplates 134 are removably bolted to clevis-type connectors 140 provided on the inside face of these rear endplates 138 intermediate the side margins thereof. Similar plates 142 extending transversely between the front partition wall uprights 28 of adjacent stalls close the front end of the pig areas. The pig feeders 136 are bolted or otherwise attached to these front endplates intermediate the side edges thereof as shown in FIGURE 1.

Referring now to FIGURES 1, 2, 3, 6 and 7, it will be seen that the pig feeders 136 are similar in design to the sow feeder 110 in that the divider 144 is shaped to confine the pig's snout and prevent them from swinging their heads from side to side. In the pig feeders this is accomplished by bending the divider so that it has a generally sinusoidal-shaped cross section as revealed most clearly in FIGURE 1. The divider is set in a shallow tray 146 which is capable of holding either liquid or dry feed, the former being preferred. Note in FIGURE 1 that each pig feeder serves the adjacent pig areas of two separate stalls. A center partition is preferably provided in the compartments 150 of each feeder forming a continuation of wall 134 and rendering each compartment somewhat shallower by blocking off the pointed portion thereof. This central partition terminates short of the bottom of the tray as can be seen in FIGURE 2. The depth and width of the pig feeder compartments 150 are, of course, quite a bit less than that of the sow feeder due to the smaller size of the animals. The same is true of the height of the side and endwalls that define the pig areas except for the partition walls 26 that are shared by both the pig and sow areas.

The usual practice is to supplement the sow's milk with "pre-starter" feeds which are very rich in milk and, while enjoyable to the animal, they will not eat much. Other compartments will have a "starter" feed which they soon prefer to the "pre-starter." Still another may have a special feed rich in minerals which the sow's milk does not have yet which the pigs' systems demand. The sow, on the other hand, is fed a special ration which satisfies her hunger and promotes "colostrum milk" formation for the pigs she must nurse. Note that the pig areas 40 do not include access to the watering trough 86 as does the sow area. The reason for this is that water for the pigs should be located nearer to or on the gratings rather than with the feeder because of the pig's normal tendency to urinate while they drink or immediately thereafter. With the sow this is no problem because her rear extremities are always located over the gratings; however, with the little pigs, this is not the case and their water should, therefore, be placed at the rear of the pen.

Now, one of the most important features of the instant stall is the provision of localized heating in the pig areas because the successful operation of the unit is dependent to a large extent on this feature. The sub-floor heaters 18 extend under almost the entire pig areas except for that portion which is covered by the gratings. Each heater is divided into two separately-controllable zones, one at the front of the stall and the other behind the first at the middle of the stall. Initially, the heaters maintain the floor temperature in the pig areas at approximately 90°–95° F. and both the front and rear zones are activated. A thermostat 152 controls the heaters 18. The little pigs, as soon as they are born, are drawn by the heat of the sow's breast to nurse. While nursing, they lay on the heated areas of the stall, either those directly over the heaters or the floor of the sow area adjacent thereto which is heated by conduction. Then, when satisfied at their mother's breast, the little pigs make their nest on the warmed pig areas protected completely from the sow's movements during which she might step or lay on them.

Even new-born pigs barely able to walk will leave their bed and its feed to dung and urinate. In so doing they migrate to the farthest corner of the stall as long as it is not over seven feet or so away; hence, the seven foot length of the pen. The width is also important in this respect because if the pen were as wide as it was long, the pigs nesting on one side would tend to go to the other side of the pen to relieve themselves thus fouling the nests of the pigs nesting on that side. If, as in the instant stall, the width is substantially less than the length, i.e. about five feet or so, all the pigs will wander to the grate-covered waste trough to dung and urinate. Excrement that has worked through the grating into the waste trough 14 is removed by methods or with apparatus well known to the art.

After the first day or so after the pigs are born, the rear zone of both heater units is turned off and only the front zones remain warm. These lie right next to the pig feeders and encourage them to supplement their mother's milk with other feed thus enabling them to be weaned in a period of about three weeks instead of the usual seven. Here again, the pigs' tendency to snuggle up to their mother's body to keep warm when they are not nursing in which position they are in the greatest danger of being trampled is eliminated as they are drawn to their heated nesting areas.

Once the pigs have been weaned they are transferred to a nursing building containing rows of similarly designed stalls insofar as the location of the feeding and dunging areas are concerned. These nursery stalls are slightly narrower as they require no isolated sow area. They are, however, similar enough in design that the recently-born pigs feel at home in an environment quite like that in which they lived with their mother for a few weeks.

Having thus described the several useful and novel features of the hog farrowing stall of the present invention it will be seen that the several worthwhile objectives for which it was designed have been achieved. Although but a single embodiment of the invention has been illustrated and described, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. In a hog stall which comprises a rectangular enclosure having a width of approximately five feet and a length of approximately seven feet, having a feeder means located at one end of the enclosure, the improvement comprising a recessed waste gutter extending laterally along the other end of the enclosure, and open gratings covering said gutter forming a floor whose area is not greater than approximately one-fourth to one-third of the total floor area of the stall, said gratings each comprising a plurality of T-irons arranged in spaced parallel relation with their cross-bar forming portions uppermost and their stem portions projecting downwardly, the adjacent T-irons being spaced apart a distance insufficient for the hoof of a new born pig to pass therebetween yet being spaced apart a distance sufficient to permit body wastes to be forced therethrough into the gutter by the pigs' feet and sub-floor heater means located and positioned adjacent to the feeder means at said one end and extending almost to the waste gutter.

2. The hog stall as set forth in claim 1 in which a pair of longitudinally-extending partition walls laterally spaced apart approximately two feet to divide the enclosure into a centrally-located sow area bounded on both sides by pig areas of approximately equal size, said partition walls being spaced above the floor a distance which will allow new born pigs free access between the sow and pig areas yet will prevent a mature sow confined in the sow area from passing into the pig areas.

3. The hog stall as set forth in claim 1 in which feeders are located on both sides of the enclosure in position to form a portion of the sidewall thereof, said feeders each including at least two compartments accessible from inside the stall and arranged side-by-side, said compartments each being shaped to receive a pig's snout and confine same so that the head cannot move from side-to-side as they feed.

4. The hog stall as set forth in claim 2 in which a second gutter recessed in the floor extends laterally along the opposite end of the enclosure from the waste gutter in parallel relation to the latter, a watering trough overlies the second gutter forming a cover therefor, access openings are provided from the sow area into both the watering trough and second gutter sized to receive the sow's snout, said second gutter being adapted to deliver fresh pre-cooled air to the sow area.

5. The hog stall as set forth in claim 2 in which a roof-forming gate is hingedly attached to one of the partition walls along the top edge thereof, said gate being moveable into a horizontal position covering that portion of the sow area ahead of the gratings and prevent a sow placed therein from climbing out of the enclosure, and means releasably latching said roof-forming gate to the other of said partition walls when in horizontal position.

6. The hog stall as set forth in claim 2 in which the gratings covering the waste gutter in the sow area comprise a front and rear section, at least the rear section of which is removeable, a shallow tray sized and adapted to be substituted for the rear section of the gratings, and means comprising a gate attachable between the partition walls extending transversely immediately above the front edge of the tray, said gate being spaced above the floor a distance which will permit a sow in the sow area to deliver her pigs into the tray yet will prevent said sow from moving her body or feet into the tray-containing area of the enclosure.

7. The hog stall as set forth in claim 2 in which a feeder is located in the end of the sow area opposite the gratings and forms a closure therefor extending laterally between the partition walls, said sow area feeder including a watering compartment and a feed compartment arranged in side-by-side relation, both said feed and watering compartments being shaped and sized to receive and confine the snout of a sow so as to prevent her from moving her head from side-to-side.

8. The hog stall as set forth in claim 2 in which an access gate provides the closure for the grate-covered end of the sow area, said gate including a forwardly projecting bumper element positioned and adapted to engage the rump of a sow in the sow area preventing her from moving backward all the way to the rear of the enclosure.

9. The hog stall as set forth in claim 2 in which a pig feeder is located in each of the pig areas, said pig feeders forming a portion of the sidewalls of the closure, each of said feeders including at least two compartments accessible from inside the stall and arranged side-by-side, said compartments being shaped and sized to receive a pig's snout and confine same so that the head cannot move from side to side as they feed.

10. The hog stall as set forth in claim 3 in which an upstanding divider having a generally sinusoidal cross section defines the compartments, said divider also producing similarly-shaped compartments on the outside of the enclosure opening onto the interior of an adjacent stall.

11. The hog stall as set forth in claim 1 in which the sub-floor heaters are divided into front and rear separately-controllable zones.

12. The hog stall as set forth in claim 7 in which a top-loading chute is provided in the feeding compartment of the sow feeder and a coverplate overlying the watering trough positioned to receive the feed discharged from the lower end of said chute.

13. The hog stall as set forth in claim 9 in which a centrally-located partition is provided in each compartment of the pig feeder reducing the depth thereof by blocking off its rear extremity.

14. The hog stall as set forth in claim 12 in which a damper-type gate is provided in the chute spaced below the open top thereof, said gate providing means for delivering a pre-measured quantity of dry feed piled on said gate into the feeding compartment.

References Cited by the Examiner

UNITED STATES PATENTS

| | | | |
|---|---|---|---|
| 809,543 | 1/06 | Vail | 119—20 |
| 1,259,802 | 3/18 | St. John | 119—28 |
| 1,629,979 | 5/27 | Steinback | 119—51 |
| 2,764,127 | 9/56 | Newman | 119—20 |
| 2,866,066 | 12/58 | Neely | 119—1 |
| 2,966,883 | 1/61 | Lietzau | 119—20 |
| 3,011,475 | 12/61 | Golay | 119—20 |
| 3,042,000 | 7/62 | McMurray et al. | 119—20 |
| 3,084,668 | 4/63 | McMurray et al. | 119—20 |

T. GRAHAM CRAVER, *Primary Examiner.*

ANTONIO F. GUIDA, *Examiner.*